US008633383B2

(12) United States Patent
Akahori et al.

(10) Patent No.: US 8,633,383 B2
(45) Date of Patent: Jan. 21, 2014

(54) ELECTRIC JUNCTION BOX

(75) Inventors: Masahiro Akahori, Makinohara (JP); Sunsoku I, Makinohara (JP); Takaaki Kakimi, Makinohara (JP)

(73) Assignee: Yazaki Corporation, Tokyo (JP)

( * ) Notice: Subject to any disclaimer, the term of this patent is extended or adjusted under 35 U.S.C. 154(b) by 0 days.

(21) Appl. No.: 13/566,448

(22) Filed: Aug. 3, 2012

(65) Prior Publication Data

US 2013/0034974 A1 Feb. 7, 2013

(30) Foreign Application Priority Data

Aug. 3, 2011 (JP) ................................. 2011-169859

(51) Int. Cl.
*H02G 3/08* (2006.01)

(52) U.S. Cl.
USPC ............. 174/50; 174/559; 174/560; 174/520; 439/76.1; 439/76.2

(58) Field of Classification Search
USPC ........... 174/50, 520, 17 R, 59, 535, 559, 560, 174/561, 562, 541; 439/76.1, 76.2, 949, 439/535, 717, 718; 361/600, 601, 679.01, 361/730, 740, 752
See application file for complete search history.

(56) References Cited

U.S. PATENT DOCUMENTS

| | | | | |
|---|---|---|---|---|
| 6,541,700 | B2 * | 4/2003 | Chiriku et al. | 174/50 |
| 7,878,357 | B2 * | 2/2011 | Yoshida et al. | 174/50 |
| 8,079,850 | B2 * | 12/2011 | Akahori et al. | 439/76.1 |
| 8,163,994 | B2 * | 4/2012 | Taniguchi et al. | 174/50 |
| 8,338,704 | B2 * | 12/2012 | Mizukami | 174/50 |
| 8,378,211 | B2 * | 2/2013 | Oka et al. | 174/50 |

FOREIGN PATENT DOCUMENTS

JP 2011-223767 A 11/2011

* cited by examiner

*Primary Examiner* — Angel R Estrada
(74) *Attorney, Agent, or Firm* — Edwards Wildman Palmer LLP

(57) ABSTRACT

An electric junction box for preventing rattle between cassette blocks assembled to each other before being fixed to main body case, includes a first cassette block a second cassette block configured to be assembled to each other by locking structure, an electric distribution member for distributing power to the second cassette block from the first cassette block. The electric distribution member includes an input power source line, and a pair of connectors connected with both ends of the input power source line and engaged with the lower surface of the first cassette block and the lower surface of the second cassette block, respectively. A direction of drawing the input power source line out of each of the pair of connectors is arranged perpendicular to a direction engaging the pair of connectors with the first cassette block and the second cassette block.

4 Claims, 6 Drawing Sheets

ELECTRIC JUNCTION BOX

CROSS REFERENCE TO RELATED APPLICATION

This application is on the basis of Japanese Patent Application NO. 2011-169859, the contents of which are hereby incorporated by reference.

TECHNICAL FIELD

This invention relates to an electric junction box installed into an automobile, in particular to an electric junction box having a plurality of cassette blocks.

BACKGROUND ART

There are various structures of electric junction boxes installed in an automobile in accordance with car type, e.g., an electric junction box 201 as shown in FIG. 6 that includes a plurality of cassette blocks 202, 202 on which electric component 211 is mounted, a main body case accommodating these cassette blocks 202, 203, and a upper cover 207 (refer to the PTL 1).

The aforementioned cassette blocks 202 and 203 are provided with a lock structure (not shown) locking into each other, and brackets 221, 231 adapted to be fixed to a bottom wall 260 of the main case 206 with a bolt 204 and a nut 205. These cassette blocks 202, 203, while assembled to each other by the lock structure, are inserted into the main case 206. The bolt 204 preliminarily assembled to the main body 206 is passed through a through hole disposed in the brackets 221, 232, and the nut 205 is threaded into the bolt 204, and thereby the cassette block 202, 203 are fixed to the main case 206.

[CITATION LIST]

[Patent Literature]
[PTL 1]
Japanese Patent Application Laid-Open Publication No 2011-223767

SUMMARY OF INVENTION

Technical Problem

Notwithstanding, the aforementioned electric junction box 201 poses following drawbacks. Namely, the lock structure disposed in the cassette block 202, 203 is designed so as to, expecting some margin, engage with each other though certain dimension error occurs. This leads to some rattle between the cassette blocks 202, 203 assembled to each other, and thus to problems of workability to insert these cassette blocks 202, 203 into the main body case 206, and pass the bolt 204 into the through hole of the brackets 221, 231.

Therefore, an object of the present invention is to provide an electric junction box to prevent rattle between cassette blocks assembled to each other before fixed to a main body case.

Solution to Problem

In order to attain the above-mentioned object, the invention according to a first aspect includes a first cassette block having a locking part; a second cassette block having a lock-receiving part; a main body case configured to accommodate the first cassette block and the second cassette block, and to cover a lower surface of the first cassette block and a lower surface of the second block; and an electric distribution member for distributing power to the second cassette block from the first cassette block, including an input power source line, and a pair of connectors connected with both ends of the input power source line and engaged with the lower surface of the first cassette block and the lower surface of the second cassette block, respectively, wherein the first cassette block and the second cassette block are configured to be assembled to each other by engaging the locking part with the lock-receiving part, and wherein a direction of drawing the input power source line out of each of the pair of connectors is arranged perpendicular to a direction of each engaging the pair of connectors with the first cassette block and the second cassette block.

The invention according to a second aspect, in the invention of the second aspect, further includes a projection disposed at an upper surface side of one of the first cassette block and the second first cassette block, and abutting onto the other of the first cassette block and the second first cassette block so as to prevent rattle of the first cassette block and the second first cassette block.

The invention according to a third aspect, in the invention of the first or second aspect, further includes a plurality of electric wires disposed on the lower surface of the first cassette block and the lower surface of the second block, wherein the input power source line sandwiches the plurality of electric wires adjacent to the input power source line between the power source line and either the lower surface of the first cassette block or the lower surface of the second block.

Advantageous Effects of Invention

According to the invention of the first aspect, since the electric junction box includes the electric distribution member distributing power to the second cassette block from the first cassette block, the electric distribution member including the input power source line, and the pair of connectors connected with both ends of the input power source line and engaged with the lower surface of the first cassette block and the lower surface of the second cassette block, respectively, wherein the direction of drawing the input power source line out of each of the pair of connectors is arranged perpendicular to the direction of engaging the pair of connectors with the first cassette block and the second cassette block, it is made possible to prevent rattle between the cassette blocks by stiffness of the input power source line. Therefore, it is also made possible to provide the electric junction box to prevent rattle between the cassette blocks assembled to each other before fixed to the main body case.

According to the invention of the second aspect, since the electric junction box includes a projection disposed on an upper surface side of one of the first cassette block and the second first cassette block and abutting onto the other of the first cassette block and the second first cassette block so as to prevent rattle of the first cassette block and the second first cassette block, it is made possible to further prevent rattle between the cassette blocks by virtue of prevention of upper surface side rattle by projection and lower side rattle by stiffness of the input power source line.

According to the invention of the third aspect, since the plurality of electric wires disposed on the lower surface of the first cassette block and the lower surface of the second block, wherein the input power source line sandwiches the plurality of electric wires adjacent to the input power source line between the power source line and either the lower surface of the first cassette block or the lower surface of the second block, it is made possible to further prevent rattle between the cassette blocks as well as to regulate a position of the electric wire, leading to prevention of flaws or breaking of the electric wire.

BRIEF DESCRIPTION OF DRAWINGS

FIG. 1 is an entire layout chart illustrating an electric junction block according to one embodiment of the present invention.

FIG. 2 is an exploded view of the electric junction box illustrated in FIG. 1.

FIG. 3 is a plane view of a first cassette block and a second cassette block illustrated in FIG. 1.

FIG. 4 is a perspective view of a first cassette block and a second cassette block illustrated in FIG. 1.

FIG. 5 is a perspective view illustrating a lower surface of the first cassette block and the second cassette block illustrated in FIG. 1.

FIG. 6 is a cross-sectional view of an electric junction box illustrated in the reference of the conventional art.

DESCRIPTION OF EMBODIMENTS

An electric junction box relevant to one embodiment of the present invention will be discussed with reference to FIGS. 1 to 5. The electric junction box 1 is installed into an automobile, and designed to supply power and signal to electric devices mounted onto the automobile. A junction block (referred to as junction block), a fuse block (referred to as fuse box), and a relay block (referred to as relay box) are collectively referred to as electric junction box.

Figure 1:
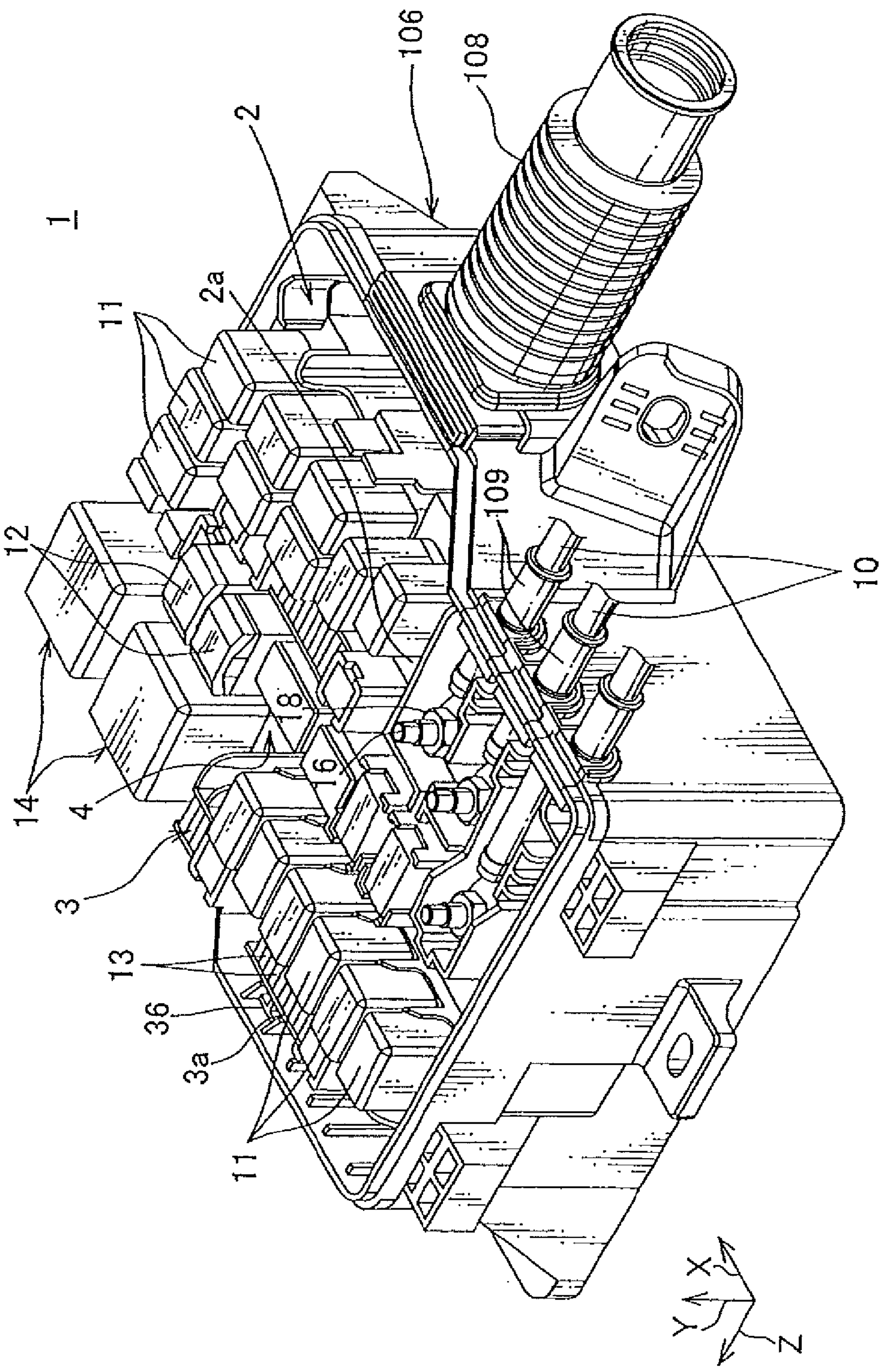
[FIG. 1]
Figure 2:
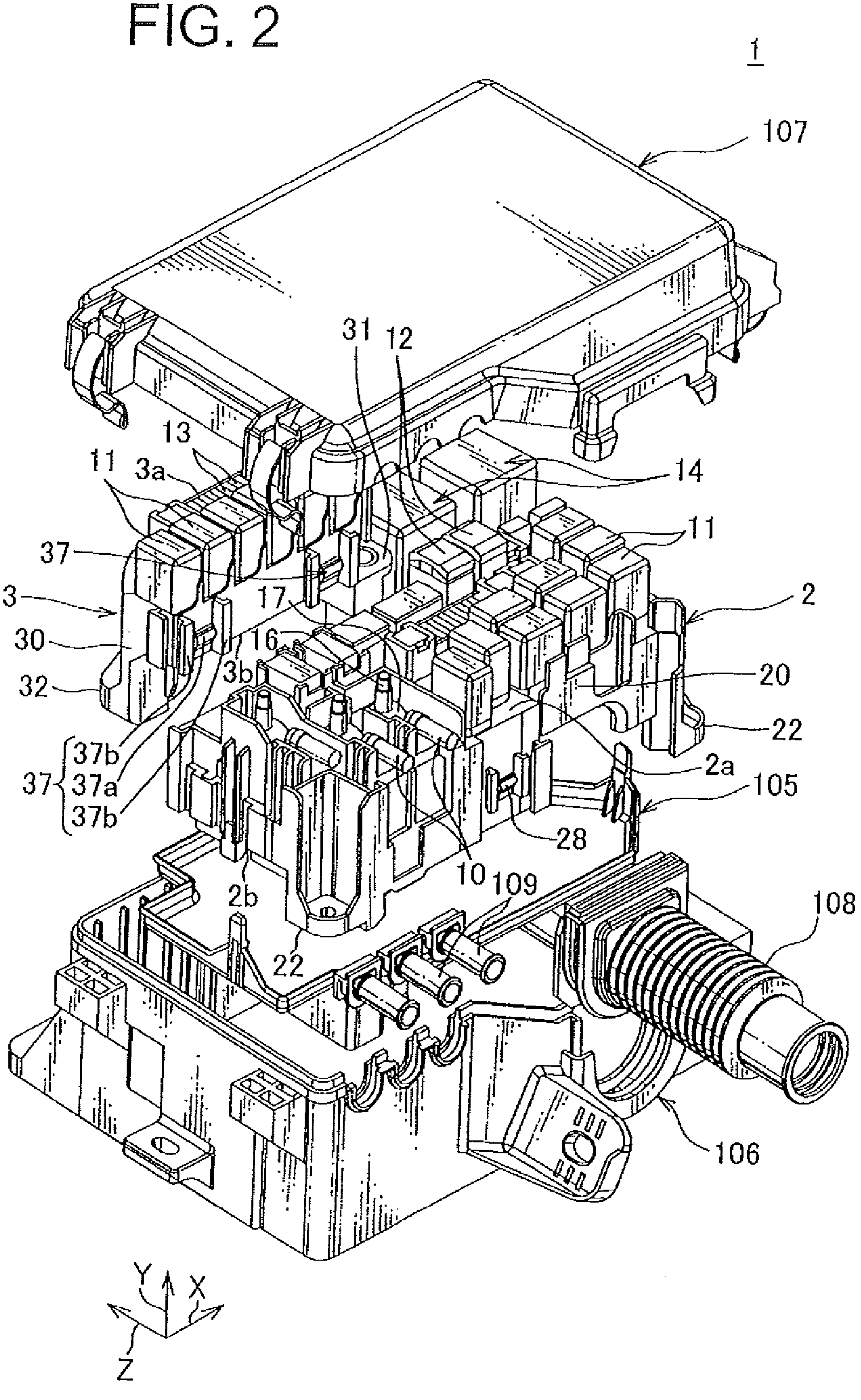
[FIG. 2]

The electric junction box 1, as shown in FIGS. 1 and 2, is provided with a plurality of electric components 11, 12, 13, and 14, a plurality of bus bars 15, a first cassette block 2, a second cassette block 3, and a third cassettes block 4, to which the plurality of electric components 11, 12, 13, and 14, and the plurality of bus bars 15 are adapted to be mounted, an electric distribution member 5 for supplying power to the second cassette block 3 from the first cassette block 2, an inner cover 105 adapted to be attached to lower surfaces 2*b* and 3*b* of the cassette blocks 2 and 3, a main body case 106 accommodating the cassette blocks 2, 3, and 4, and the inner cover 105, an upper cover 107 covering an upper surface of the main body case 106, a grommet 109 attached to outer circumference of power source line drawn into the main body case 106, so as to waterproof the main body case 106, and a grommet 108 attached to outer circumference of a bundle of the electric wire 8 of wire harness drawn out of the main body case 106, so as to waterproof the main body case 106.

Figure 3:
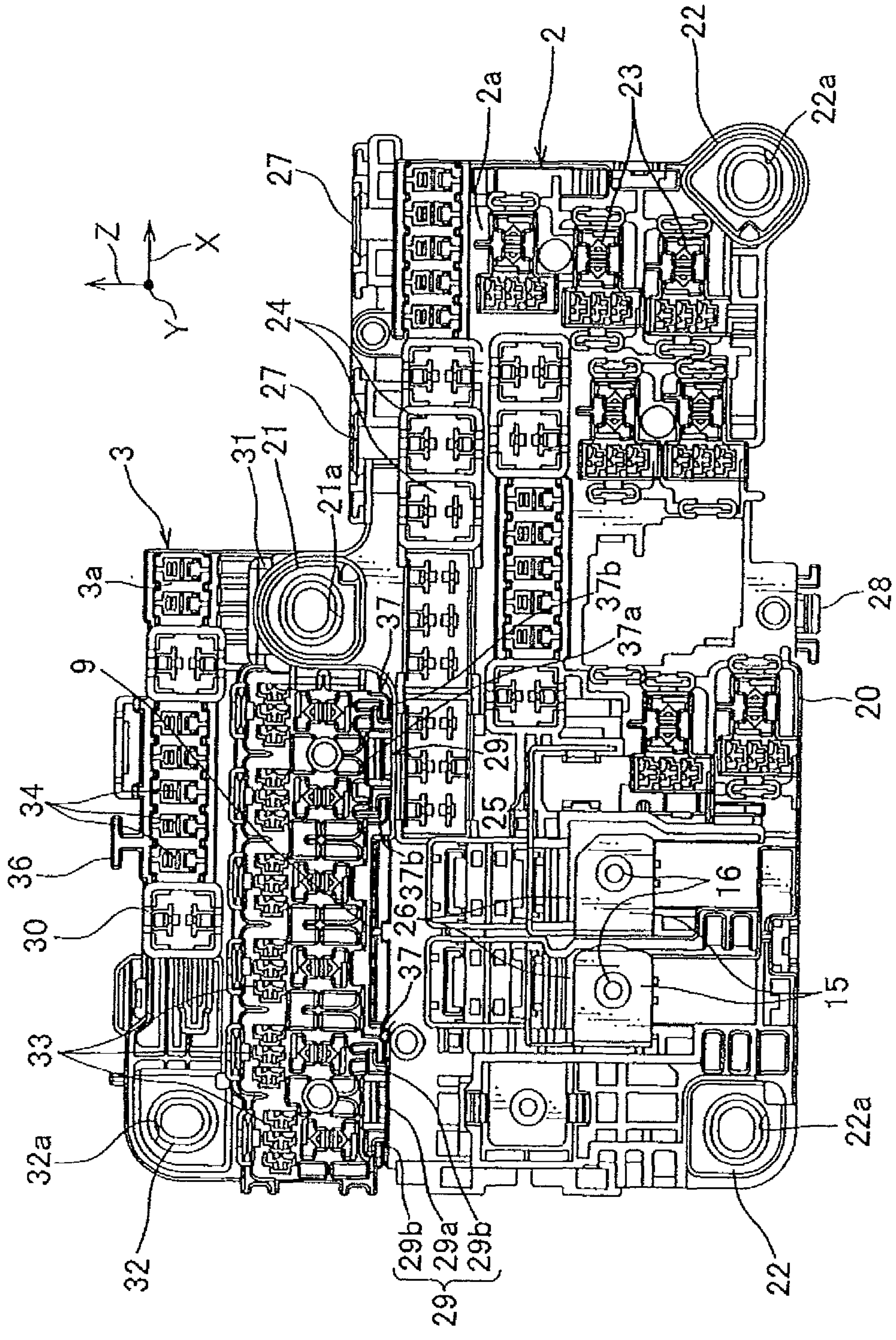
[FIG. 3]
Figure 4:
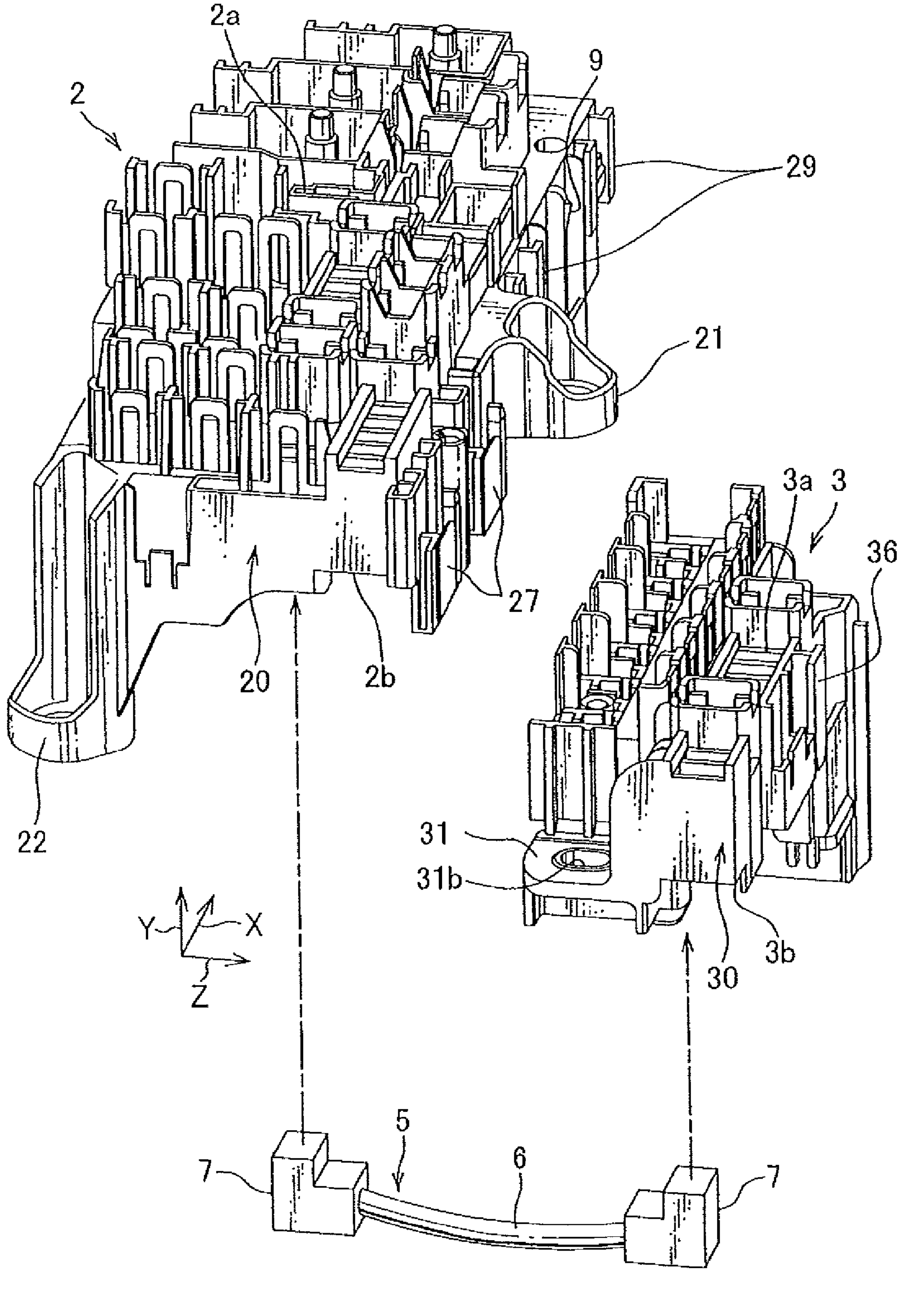
[FIG. 4]

The first cassette block 2 is made of synthetic resin, and as shown in FIGS. 3 and 4 is provided with a block-shaped main body 20, a plurality of brackets 21 and 22, and a plurality of lock parts 27, 28, and 29, and a rib 9 (corresponding to a projection in the scope of claim).

The aforementioned main body 20 is provided with a component attaching part 23 and 24, to which the electric components 11 and 12 are mounted, a bus bar-attaching groove 15 into which the bus bar 15 is inserted, and a bolt-attaching part 26 to which the bolt 16 is attached. The bus bar 15 is formed such that a metal plate is pressed. The bolt 16 is employed for tighten together a terminal fitting 17 connected with a terminal of the power source line 10, and an end of the bus bar 15. Into the bus bar 16 a nut 18 is threaded.

The reference sign 2*a* in FIGS. 1 to 4 indicates an upper surface of the main body 20, i.e., an upper surface of the first cassette block 2, the reference sign 2*b* a lower surface of the main body 20, i.e., a lower surface of the first cassette block 2. The terms “up” and “down” herein indicate directions in the figures for the sake of explanation, and necessarily not conforming with up or down direction in practical usage for the electrical junction box 1 relevant to the present invention.

The bracket 21 is disposed on an outside of the main body 20, in which a though hole 21*a* passing a bolt attached to the main body case 106 is formed. The bracket 21, while stacked onto a bracket 31 disposed in the second cassette bracket 3, is fixed to the main body case 106 with the bolt and the nut. The bracket 22 is disposed at a corner of the main body 20 and is provided with a through hole 22*a* through which a bolt attached to a bottom wall of the main body case 106 passes. The bracket 22 is fixed to the bottom wall of the main body case 106 with the bolt and the nut.

The aforementioned locking parts 27, 28, and 29 are disposed on the outside of the main body 20. Into the locking part 27 a lock receiving part disposed in the third cassette block 4 is locked. Into the lock part 28 a lock receiving part disposed on a side wall of the main body case 106 is locked. Into the lock part 29 a lock receiving part 37 disposed in the second cassette block 3 is locked. The lock part 29 is provided with a pair of rails 29*b* extending parallel to the arrow Y direction, a lock projection 29*a* disposed between the pair of rails 29*b*. The two locks 29 are disposed in the arrow X direction.

The rib 9, as shown in FIGS. 3, 4, is disposed between the pair of lock parts 29 and at a position near the upper surface 2*a* of the first cassette block 2. The rib 9 is extended in the arrow Y direction and is formed into nearly a triangle shape, viewed in the arrow X direction. The rib 9, by abutting onto the second cassette block 3, prevents rattle of the first cassette block 2 and the second cassette block 3 in the arrow Z direction.

The second cassette block 3 is made of synthetic resin, and is provided with a block-shaped main body 30, a plurality of brackets 31 and 32, and a plurality of lock receiving parts 36 and 37.

The aforementioned main body 30 is provided with a components attaching part 33 and 34 to which electric components 11 and 13 are attached, a bus bar-attaching groove (not shown).

The reference sign 3*a* in FIGS. 1 to 4 indicates an upper surface of the main body 30, i.e., an upper surface of the second cassette block 3, the reference sign 3*b* a lower surface of the main body 30, i.e., a lower surface of the second cassette block 3.

The aforementioned bracket 31 is disposed on a corner of the main body 30, and is provided with a though hole 31*b* for passing the bolt therethrough attached to the main body case 106. The bracket 31 as described above, while stacked onto the bracket 21 disposed in the first bracket 2, is fixed to the main body 106 with the bolt and the nut. The aforementioned bracket 32 is disposed on another corner of the main body 30, and is provided with a though hole 32*a* passing the bolt therethrough attached to the main body case 106. The bracket 32 is fixed to the bottom wall of the main body case 106 with the bolt and the nut.

The aforementioned lock receiving parts 36 and 37 are disposed on an outside of the main body 30. Into the lock receiving part 36 a locking part disposed on the side wall of the main body case 106 is locked. Into the lock receiving part 37 a locking part 29 disposed in the first cassette block 2 is locked. The lock receiving part 37 is composed of a pair of rails 37*b* extending parallel to the arrow Y direction, and a locking projection 37*a* disposed between the pair of rails 37*b*. The pair of rails 37*b* movably positions the pair of rails 29*b* therebetween in the arrow Y direction. The locking projection 37*a* is locked into the locking projection 29*a* such as to be positioned above the locking projection 29*a* in the arrow Y direction. There are two lock receiving parts 37 disposed, i.e., the same as the locking parts 29.

The aforementioned first cassette block 2 and the second cassette block 3, by approaching to each other in the arrow Y direction, makes the locking part 29 and the lock receiving part 37 engaged with each other to be assembled. Like this, the first cassette block 2 and the second cassette block 3, while assembled, by the locking part 29 and the lock receiving part being locked, are limited to relatively move in all directions of the arrow X direction, the arrow Y direction, and the arrow Z direction. Note that the locking part 29 and the lock receiving part 37 are designed expecting some margin to engage with each other though certain dimension error occurs. Thus, the first cassette block 2 and the second cassette block 3 assembled with each other is allowed to move to a certain extent of rattle, i.e., displacement.

The third cassette block 4 is made of synthetic resin, and holds the electric component 14 and the electric wire 8 of the wire harness brought into connection with the electric components 8. The third cassette block 4, as mentioned above, is attached to the outside of the main body 20 of the first cassette block 2.

The aforementioned component-attaching parts 23 and 24, and the aforementioned bolt-attaching part 26 is disposed on an upper surface 2*a* of the first cassette block 2, the aforementioned component-attaching parts 33 and 34 on an upper surface 3*a* of the second cassette block 3. The plurality of electric wires 8 of the aforementioned wire harness is attached to a lower surface 2*b* of the first cassette block 2, a lower surface 3*b* of the second cassette block 3, and a lower surface of the third cassette block 4, and is electrically connected to each of electric components 11, 12, 13, and 14, and the bus bar 15. A power distribution member 5 as described later is attached to the lower surface 2*b* of the first cassette block 2 and the lower surface 3*b* of the second cassette block 3, and is connected to the bus bar 15 in the cassette blocks 2 and 3.

Figure 5:
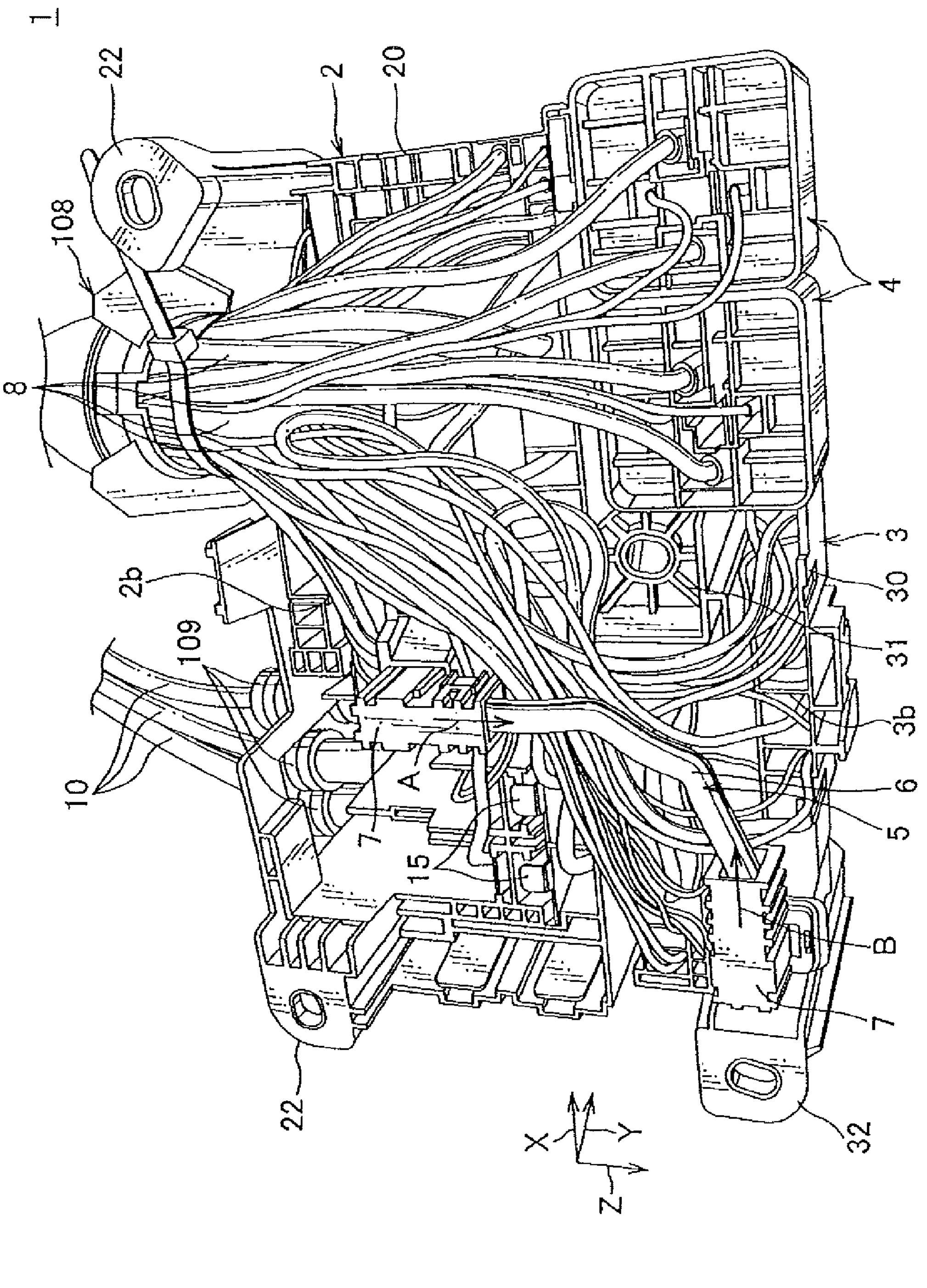
[FIG. 5]
Figure 6:
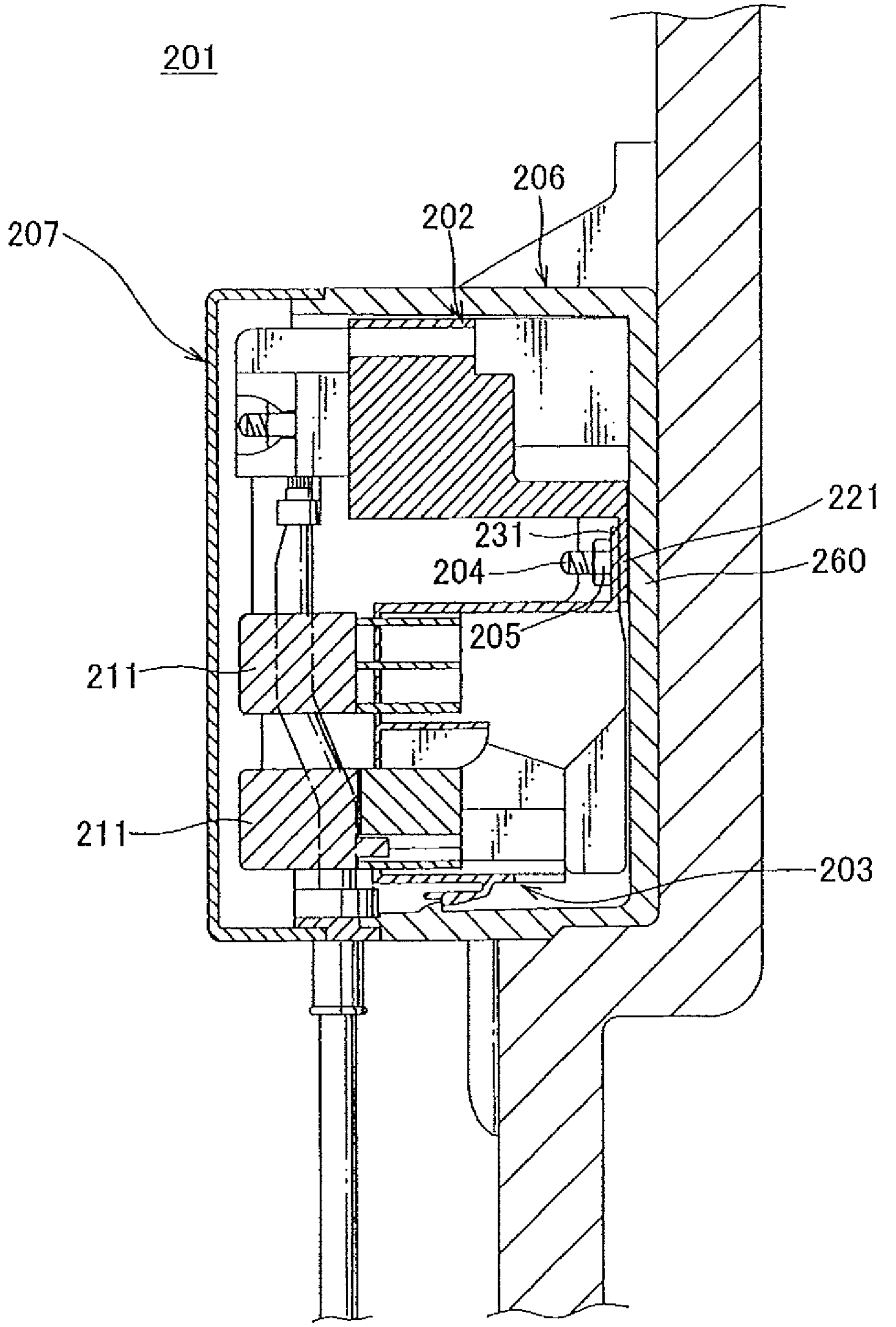
FIG. 6 PRIOR ART
[FIG. 6]

The aforementioned power distributing member 5 is the one for branching large current inputted to the first cassette block 2 from the power source such as a battery or an alternator via the power source line 10 into the second cassette block 3. The power distribution member 5 as shown in FIGS. 4 and 5 is composed of an input power source line 6 and a pair of connectors 7 connected to both ends of the input power source line 6 and each engaged with the lower surface 2*b* of the first cassette block 2 and the lower surface 3*b* of the second cassette block 3. The input power source line 6 is composed of a core wire made from a plurality of element wires, a insulative cover covering the core wire. The connector 7 is composed of a terminal fitting electrically connected with the core wire, synthetic resin housing accommodating the terminal fitting. Such the pair of connectors 7 is electrically connected with the bus bar 15 by the housing being each engaged with the lower surface 2*b* and 3*b* of the cassette blocks 2 and 3 so that the terminal fitting is each engaged with the bus bar 15 in the cassette blocks 2 and 3.

Namely, in the electric junction box 1, the large current inputted into bus bar 15 of the first cassette block 2 via the power source line 10 from the power source is branched via the bus bar, and then is supplied to each of electric components by each electric wire 8 via each electric components 11 and 12, or not via each electric components 11 and 12. A partial large current inputted into bus bar 15 of the first cassette block 2 via the power source line 10 form the power source is inputted into the bus bar 15 of the second cassette block 3 via the power distribution member 5, and is branched by the bus bar 15, and then is supplied to each of electric devices by each electric wire 8 via each of the electric components 11 and 13, or not via each of the electric components 11 and 13. The plurality of electric wires 8, as shown in FIG. 5, while bundled into one, drawn out of the main body case 106.

Furthermore, in the present invention, a direction in which the aforementioned input power source line 6 is drawn out of each of the pair of connectors 7 (that is, the arrow A or B direction in FIG. 5) is arranged a direction perpendicular to an engaging direction in which the pair of connectors 7 engages to the first cassette block 2 or the second cassette block 3 (that is, the arrow Y direction in FIG. 5). According to the present invention, it is made possible that rattle in all directions between the cassette blocks 2 and 3 assembled to each other before fixed to the main body case 106 is prevented by stiffness of the input power source line 6. Additionally, it is made possible that dimension in the Y direction of the electric junction box 1 is reduced.

Furthermore, in the present invention, as shown in FIG. 5, a direction in which one end of the input power source line 6 is drawn out of one of the connector 7 (that is, the arrow A direction) and a direction in which the other end of the input power source line is drawn out of the other of the connector 7 (that is, the arrow B direction) are arranged perpendicular to each other, and thereby the input power source line 6 is bent in nearly L-shape. According to the present invention, resilience of the input power source line 6 bent nearly L-shaped works to separate the first cassette block 2 and the second cassette block 3 from each other in the arrow Z direction, and thus it is made possible to reduce rattle between the cassette blocks 2 and 3 in the arrow Z direction.

Furthermore, in the present invention, since near the upper surface 2*a* of the first cassette block 2 the aforementioned rib 9 is disposed, rattle of the upper surfaces 2*a* and 3*a* of the cassette blocks 2 and 3 is constrained by the rib 9, rattle of lower surfaces 2*b* and 3*b* by the stiffness of the input power source line 6, it is made possible further to reduce rattle between the cassette blocks 2 and 3.

Furthermore, in the present invention, as shown in FIG. 5, input power source line 6 press the plurality of electric wires 8 adjacent to the input power source line 6 toward the lower surface 2*b* of the first cassette block 2 and the lower surface 3*b* of the second cassette block 3. This makes a position of the electric wire 8 to be restrained, and prevents flaws or breaking of these electric wires 8 induced by these electric wires abutting onto such edges of the bus bar 15. Furthermore, in the present invention, it is not necessary for the input power source line 6 to press the plurality of electric wires 8 adjacent to the input power source line 6 toward the lower surfaces 2*b* and 3*b*, but it pay be possible not to contact the electric wires 8.

The aforementioned main body case 106 is defined by the rectangular bottom wall and side walls upstanding from edges of the bottom wall, and is box-shaped open to one direction. To inside the main body case 106 four bolts for fixing the aforementioned brackets 21, 22, 31, and 32 are attached. These bolts are attached to inside the main body case 106 so that a axis direction thereof is arranged parallel to the arrow Y direction. The aforementioned cassette blocks 2, 3, and 4 are accommodated in the main body case 106 in such a direction that the lower surfaces 2*b* and 3*b* face the bottom wall.

The aforementioned electric junction box 1 is assembled in such a procedure as mentioned below.

First, each of components such as the bolt 16, the bus bar 15, the plurality of electric components 11, 12, 13, and 14 is mounted in each of cassette blocks 2, 3, and 4.

Then, the locking part 29 of the first cassette block 2 and the lock receiving part 37 of the second cassette block 3 are approached in the arrow Y direction to engage to each other, so as to assemble the first cassette block 2 and the second cassette block 3. Likewise, the locking part 27 of the first cassette block 2 and the lock receiving part of the third cassette block 4 is approached in the arrow Y direction to engage to each other, so as to assemble the first cassette block 2 and the third cassette block 4.

Then, the plurality of wires 8 of the wire harness is connected with each of electric components 11, 12, 13, and 14, and bus bar 15. The pair of connectors 7 of the power distribution member 5, carefully avoiding contacting the electric wires 8 onto the edges of the bus bar 15, is engaged with each of the lower surfaces 2*b* and 3*b* of the cassette blocks 2 and 3, and with the input power source line 6 the electric wire 8 adjacent to the input power source line 6 is held.

Then, the terminal fitting 17 of the terminal of the power source line 10 and an end of the bus bar 15 are fastened together with the bolt 16 and the nut 18.

Then, to sides of the lower surfaces 2*b* and 3*b* of the cassette blocks 2 and 3 assembled together, the inner cover 105 is attached. Note that the inner cover 105 is designed to prevent the electric wire 8 from being bitten when inserting the cassette blocks 2, 3, and 4 assembled together into the main body case 106.

Then, the cassette blocks 2, 3, and 4, and the inner cover 105 are inserted into the main body case 106, and simultaneously, each bolt attached to inside the main body case 106 is passed through the through holes 21*a*, 22*a*, 31*b*, and 32*a* of each of the brackets 21, 22, 31, and 32. In the present invention, when working the above, as mentioned above, prevention of rattle of the cassette blocks 2 and 3 assembled together makes it likely that positions of each of the through holes 21*a*, 22*a*, 31*b*, and 32*a*, and each blot are fitted, and it is thus made possible to pass the bolt through the through holes 21*a*, 22*a*, 31*b*, and 32*a*. Subsequently, the nut is threaded into each of the bolts, so as to fix the cassette blocks 2, 3, and 4 and the inner cover to the main body case 106.

Then, the grommet 109 attached to a circumference of the power source line 10, and the grommet 108 attached to a circumference of the bundle of the electric wires of the wire harness are attached to each through hole disposed on the side wall of the main body case 106. Then, to an upper surface of the main body case 106 the upper cover 107 is attached. In accordance with such the procedure the electric junction box 1 is completed.

It is to be understood the present invention is just shown by the aforementioned embodiment as a typical embodiment but is not limited to this embodiment. Therefore, unless otherwise such changes and modifications depart from the scope of the present invention hereinafter defined, they should be construed as being included therein.

REFERENCE SIGNS LIST

1 electric junction box
2 first cassette block
2*b* lower surface
3 second cassette block
3*b* lower surface
5 power distribution member
6 input power source line
7 connector
29 locking part
37 lock receiving part
106 main body case

The invention claimed is:

1. An electric junction box, comprising:

a first cassette block having a locking part;

a second cassette block having a lock-receiving part;

a main body case configured to accommodate the first cassette block and the second cassette block, and to cover a lower surface of the first cassette block and a lower surface of the second block; and an electric distribution member for distributing power to the second cassette block from the first cassette block, including an input power source line, and a pair of connectors connected with both ends of the input power source line and engaged with the lower surface of the first cassette block and the lower surface of the second cassette block, respectively, wherein the first cassette block and the second cassette block are configured to be assembled to each other by engaging the locking part with the lock-receiving part, and wherein a direction of drawing the input power source line out of each of the pair of connectors is arranged perpendicular to a direction of each engaging the pair of connectors with the first cassette block and the second cassette block.

2. The electric junction box as claimed in claim 1, further comprising a projection disposed at an upper surface side of one of the first cassette block and the second first cassette block, and abutting onto the other of the first cassette block and the second first cassette block so as to prevent rattle of the first cassette block and the second first cassette block.

3. The electric junctions box as claimed in claim 1, further comprising a plurality of electric wires disposed on the lower surface of the first cassette block and the lower surface of the second block, wherein the input power source line sandwiches the plurality of electric wires adjacent to the input power source line between the power source line and either the lower surface of the first cassette block or the lower surface of the second block.

4. The electric junction box as claimed in claim 2, further comprising a plurality of electric wires disposed on the lower surface of the first cassette block and the lower surface of the second block, wherein the input power source line sandwiches the plurality of electric wires adjacent to the input power source line between the power source line and either the lower surface of the first cassette block or the lower surface of the second block.

* * * * *